United States Patent [19]
Lee

[11] Patent Number: 5,716,323
[45] Date of Patent: Feb. 10, 1998

[54] ELECTRICAL ISOLATION OF ENDOSCOPIC VIDEO CAMERA

[75] Inventor: David B. Lee, Goleta, Calif.

[73] Assignee: Karl Storz Imaging, Goleta, Calif.

[21] Appl. No.: 418,139

[22] Filed: Apr. 5, 1995

[51] Int. Cl.$^6$ ............................................. A61B 1/05
[52] U.S. Cl. ................................. 600/134; 348/76
[58] Field of Search ........................... 600/134, 101, 600/117, 118; 348/296, 76; 128/901

[56] References Cited

U.S. PATENT DOCUMENTS

| | | |
|---|---|---|
| 4,706,118 | 11/1987 | Kato et al. ............................. 348/76 |
| 4,868,647 | 9/1989 | Uehara et al. ......................... 348/76 |
| 4,931,867 | 6/1990 | Kikuchi ................................. 348/76 |

Primary Examiner—Linda C. Dvorak
Assistant Examiner—John P. Leubecker
Attorney, Agent, or Firm—David O'Reilly

[57] ABSTRACT

A video camera isolation circuit for use with video cameras that are coupled to endoscopes utilizes simple pulse transformer technology to isolate the video camera head from the video processing circuitry allowing the processing circuitry to be referenced to ground. The video signal from the CCD sensor in the camera head is specially processed to prevent shutter pulses from interfering with the isolated video signal. Special circuitry blanks the shutter pulse from the pulse transformer. Open collector data circuitry is also specially processed by dual channel detecting and amplifying circuits which are transistor switched through the pulse transformers before being delivered to and from the camera head. Timing pulses are processed through logic buffering conditioning circuitry and pulse transformers for reconstruction on the secondary of the pulse transformer by hysteresis buffers. The circuits described allow simple pulse transformer technology to affectively isolate the video camera head connected to an endoscope from the electronic circuitry.

25 Claims, 2 Drawing Sheets

ELECTRICAL ISOLATION OF ENDOSCOPIC VIDEO CAMERA

BACKGROUND OF THE INVENTION

1. Field of the Invention

This invention relates to electrical isolation circuits, and more particularly relates to an electrical isolation current circuit for use with endoscopic video cameras.

2. Background Information

Endoscopic video cameras are now used with endoscopes in general surgery. To perform the general surgery, a video camera head is coupled to an endoscope for communicating images of internal organs through the optical endoscope to monitor and view the field of surgery. The complete endoscopic system and video camera are comprised of an endoscope having an optical adaptor and a video camera head connected by an umbilical cord to video camera electronics.

Increasingly stringent safety requirements within the medical industry will require that medical endoscopic cameras provide electrical isolation for the safety of the patient. Even a small current reaching the tissue of a patient can cause serious injury. To provide safety, video camera electronics need to be isolated from the patient for safety purposes.

The most common response to the requirement for electrical isolation is to apply some form of mechanical isolation to the camera head rather than contend with complicated electrical isolation. However, electrical isolation has some advantages over merely mechanically isolating the camera head from the camera electronics. Also, electrical isolation can be more effective than mechanical insulation, and more convenient. Besides being safer, and probably less expensive, it can eliminate the need to retrofit older camera head assemblies with insulating materials and permit the design of new camera head assemblies from standard materials. Present designs of these video camera systems can remain unchanged. Mechanical isolation of the video camera head would also require insulation of all electrical components so that no electrical current could reach a patient being examined or treated. While it appears to be a simple solution in theory, practically speaking, some mechanical isolation techniques can be faulty and cumbersome causing considerable inconvenience in using, making or servicing the endoscopes and video camera equipment.

Electrical isolation could also be provided by completely isolating the majority of electronics at the output to host circuitry. This method would require that all inputs and outputs to the camera circuitry pass through isolated channels. While this approach could be effective, the disadvantages are, that excessive insulation would be required because the electronics would be "floated" from the chassis. A large number of expensive isolation channels, one for each video output and cable interface, would be required. Each video channel would then need a number of alignment steps.

Another possible solution would be the use of opto-isolators. However, such isolators require high gain and are susceptible to noise. Also, wide band, low distortion linear opto-isolators that would be necessary, are expensive. Simpler and more practical solutions to the electrical isolation of video camera electronics, coupled to an endoscope through the camera head, would be advantageous.

It is therefore, one object of the present invention, to provide electrical isolation of medical endoscopic camera electronics from an endoscope.

Another object of the present invention is to provide electrical isolation of medical endoscopic camera electronics by isolating the camera head from the video processing circuit.

Still another object of the present invention is to provide electrical isolation of medical endoscopic camera electronics that keeps the isolating circuitry and components to a minimum.

Yet another object of the present invention is to provide electrical isolation of medical endoscopic camera electronics using pulse transformer technology.

Still another object of the present invention is to provide electrical isolation of medical endoscopic camera electronics using technology that maintains strict leakage and insulation requirements with simple electronic circuitry.

Still another object of the present invention is to provide electrical isolation of medical endoscopic camera electronics that prevents interference from shutter pulses.

Yet another object of the present invention is to provide electrical isolation of medical endoscopic camera electronics that can process and isolate bidirectional data signals.

Still another object of the present invention is to provide electrical isolation of medical endoscopic camera electronics that isolates timing signals by converting timing pulses to leading and lagging spikes which are reconstructed on the secondary side of a pulse transformer.

Yet another object of the present invention is to isolate open collector bidirectional data signal lines of camera electronics using electronic shunts on the primary and secondary side of a pulse transformer.

BRIEF DESCRIPTION OF THE INVENTION

The purpose of the present invention is to use simple, electronic circuits to electrically isolate the camera head in a medical endoscopic video camera from the camera electronics.

The coupling of an endoscopic video camera, for use in endoscopic procedures, is illustrated in U.S. Pat. No. 5,168,863 of Kurtzer, issued Dec. 8, 1992 and incorporated herein by reference.

The isolation is achieved by electronic circuitry that permits isolation of the video output from the camera head. The isolating circuitry and components are kept to a minimum while maintaining the strict leakage and insulation requirement desirable. Video camera heads contain a charge couple device (CCD) sensor that is connected to the camera electronics through an umbilical cord. The isolation circuitry of the present invention is designed to isolate the camera head from the video camera or host electronics by providing pulse transformers and appropriate circuitry that can support the bandwidth of video signals from the CCD sensor, the bidirectional data signals and the timing signals.

The isolation circuitry is designed to isolate the camera head from camera electronics so that the host chassis and circuitry remain common to ground. Only the camera head is isolated. The advantages to this approach is that it is more direct and does not affect the input/output (I/O) structure of the endoscopic video camera. Most signals, needed to support the endoscopic video camera, are isolated with simple pulse transformer circuitry. Video signals from the CCD sensor, in the camera head are isolated with a pulse transformer and circuitry that prevents interference from shutter pulses. Bidirectional (open collector) data signals are isolated with a pulse transformer and circuitry that can sense direction and maintain speed. Timing pulses are also isolated with pulse transformers, conditioning circuitry and circuitry that can reconstruct the timing pulse on the secondary of the pulse transformer. The simple pulse transformer circuitry of the present invention allows the camera head to be isolated from camera electronics so that the host chassis and circuitry remain common to ground.

The video signal from the CCD sensor, in the camera head, has a wide bandwidth in the format of discrete, DC referenced amplitudes; a linear pixel stream. This signal can be DC restored (clamped) at the pixel rate to cover all the bandwidth below the pixel rate. Thus, an isolation channel with relatively narrow bandwidth (pixel rate to two octaves) can be used provided that each video signal is DC restored at the pixel rate. Since DC restoration circuitry is already implemented in medical endoscope camera electronics, this isolation technique has minimal impact on camera circuit design. The video signal from the CCD sensor, in the camera head, is isolated using a pulse transformer which is inexpensive and provides good linearity as well as excellent high frequency response. The pulse transformer is made to conform to the needed insulation and leakage requirements.

A difficulty in isolating the video signal from the CCD sensor in the camera head, is that it may include interference from shutter pulses, which are much greater in amplitude than the pixels. The shutter pulses are a common feature of endoscopic video cameras using CCD image sensors. The shutter pulse gets into the video signal from the CCD sensor as a result of parasitic coupling. This interference can saturate an isolation transformer causing errors in the DC restoration process. To overcome this difficulty and protect the pulse transformer, a special switch is implemented to open the primary circuit of a pulse transformer during the pulse duration to keep the shutter pulse out of the video signal path. This eliminates the need for complicated DC restoration circuitry.

The isolation of open collector data signals requires a unique approach because of their bidirectional nature. These signals are bidirectional data signals that go to and from the video camera head through an umbilical cord. The bidirectional signals of an open collector data line operate by allowing multiple nodes to communicate over a single pair of wires. The active logic state of the open collector data line is a "low" which is accomplished when a transistor, in any node, is turned on. All nodes can listen at the same time, and communicate with each other as dictated by a particular protocol.

Most isolation schemes are only unidirectional and will not work for an bidirectional open collector data line where sending and receiving is done at both ends. Thus, a key problem is the insertion of an isolation channel into an open collector data line using pulse transformer technology. Pulse transformers, however, have the useful ability to transfer a load impedance from one winding to another, regardless of direction (primary to secondary or vice versa) so it can be applied to this problem by representing the logical state as an impedance. This can be achieved with an electronic shunt switch connected to both windings of a pulse transformer, and by applying an AC voltage source (a carrier signal) to one of the windings through a resistor. When either the primary or secondary shunt switch is closed, a level of the carrier drops on both sides of the transformer analogous to the level drop on a open collector line. A detection circuit on each side of the transformer discerns if the low carrier level originated from the opposite transformer winding and, if it did, switches its side of the open collector line low.

There are a number of timing signals from video camera electronics going through the umbilical cord to the camera head. These timing signals are isolated also using simple, pulse transformers. Timing pulses are simple logic level pulses. The transformer primary is driven with pulses from a logic buffer. Since the pulses are much longer than the time constant of a transformer circuit, only the leading and lagging spikes representing the edges of the pulse are passed through the pulse transformer. The spikes are then biased to a voltage reference at the transformer secondary, and applied to a hysteresis buffer which toggles up and down to reconstruct each timing pulse.

The above and other novel features of the invention will be more fully understood from the following detailed description and the accompanying drawings, in which:

DETAILED DESCRIPTION OF THE DRAWINGS

Figure 1:
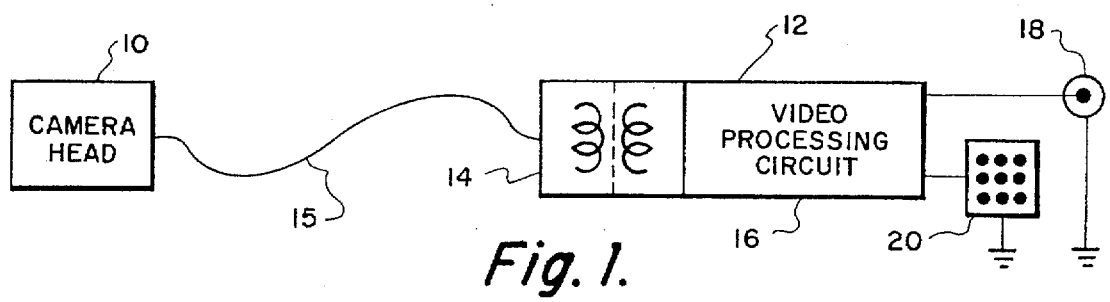
FIG. 1 is a block diagram illustrating the isolation of an endoscopic video camera head from camera electronics.

The simplified block diagram of FIG. 1 illustrates a video camera system for use with endoscopes. Camera head 10, having CCD sensor and other electronics, is isolated from camera electronics 12 that include an isolation circuit 14 and a video processing circuit 16 connected to the camera head through umbilical cord 15. Video processing circuit 16 is a part of the camera electronics that processes signals from camera head 10 to provide a video output at terminal 18. Control inputs and outputs 20 represent user controls such as keyboards, consoles and switches to manipulate the operation of the endoscopic video camera.

Figure 2:
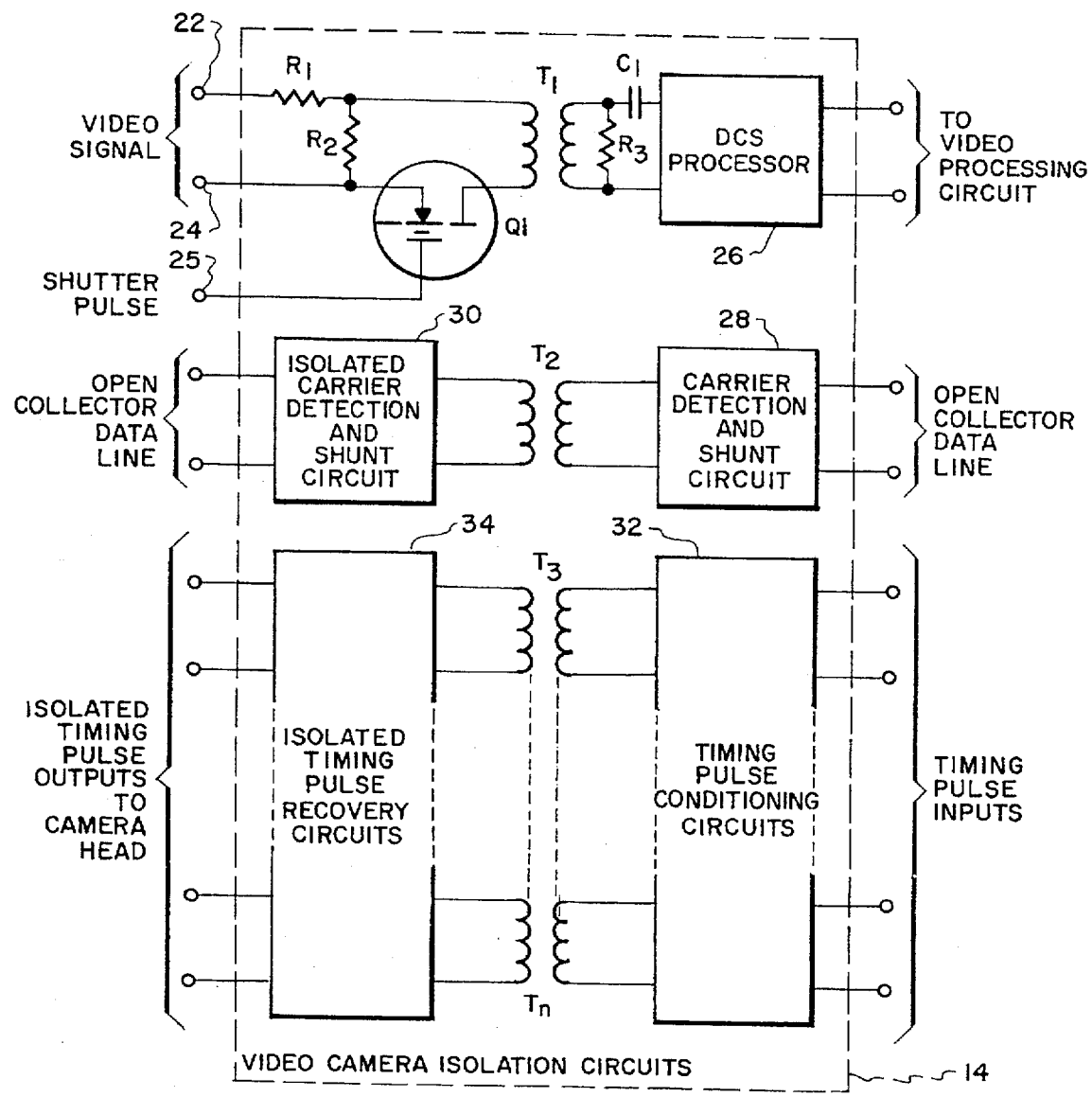
FIG. 2 is a semi-schematic block diagram of isolation circuits for isolating the endoscopic video camera head from camera electronics.

In a preferred embodiment of the invention, the isolation circuit illustrated in the block diagram of FIG. 2 is provided to isolate video camera head 10 from camera electronics. The video camera isolation circuit 14 uses a plurality of pulse transformers $T_1$, $T_2$ and $T_3$ through $T_n$ to provide isolation of video camera head 10 from camera electronics. The design involves the isolation of three types of signals. The video signal is isolated using pulse transformers and special circuitry to avoid interference from shutter pulses. Bidirectional open collector data signals are isolated using pulse transformer technology that can sense direction. The third type of isolation circuitry isolates timing pulses by conditioning the timing pulses to present leading and lagging spikes to a pulse transformer which are then reconstructed on the secondary side.

As shown in FIG. 2, the video signal is received on terminals 22 and 24, and applied to series/parallel combination of resistors $R_1$ and $R_2$, MOS/FET transistor $Q_1$ and pulse transformer $T_1$. Transistor $Q_1$ acts as a switch to keep interference from shutter pulses received on terminal 25 out of the video signal circuits. The signal on the secondary of pulse transformer $T_1$, across resistor $R_3$, is then applied to processing circuit 26 via blocking capacitor $C_1$. Processing circuit 26 implements a double correlated sampling process (DCS) which is commonly used in the art for recovering the signal output of a charge coupled device (CCD). This process has the equivalent effect of clamping in that it provides DC restoration to the signal at pixel rate sampling. For each pixel cycle, a sample and hold amplifier in processing circuit 26, measures the amplitude of the pixel and the amplitude of a reference level on the signal. The two levels are subtracted to obtain a ground reference signal that is equivalent to clamping. A device commonly used to provide this function is the CXA1390 integrated circuit (IC) made by SONY ELECTRONICS Corp. or its equivalent. The video signal output from processing circuit 26 is then applied to a typical video processing circuit 16 to produce a standard video signal at terminal 18.

Isolation of bidirectional signals on the open collector data line requires special techniques that can sense direction and maintain speed of the bidirectional signals. Most isolation schemes are only unidirectional and will not work for an open collector line where sending and receiving is done at both ends. The isolation circuit for bidirectional data, shown in FIG. 2, includes carrier detection and shunt circuits 28 and 30 on each side of pulse transformer $T_2$ to translate the carrier signal to open collector logic. Pulse transformer $T_2$ has the unique ability of transferring a load impedance from one winding to another regardless of direction (primary to secondary and vice versa) and provides isolation of bidirectional signals by representing the logical state by an impedance. Carrier detection circuits 30 and shunt circuit 28 on either side of pulse transformer $T_2$ detect a carrier, and whether it is a result of a logical level on the opposite side of the transformer or on the same side, so the system will not lock itself in a low state when sending a low level. The isolation circuit for bidirectional signals on the open collector data line will be described in greater detail hereinafter.

Isolation circuits for timing pulses use simple pulse transformer technology. Each timing pulse is conditioned by timing pulse conditioning circuits 32 on the primary side of transformer $T_3$ to convert them to leading and lagging spikes. The timing pulses are then reconstructed or recovered on the secondary side of transformers $T_3$ through $T_n$ (one for each timing pulse) by isolated timing pulse recovery circuits 34. A typical circuit for isolation of a timing pulse will be described in greater detail hereinafter.

Figure 3:
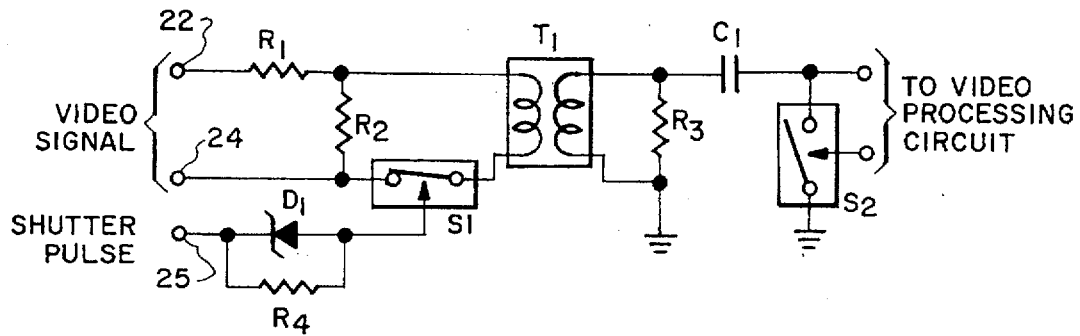
FIG. 3 is a simplified schematic of an isolation circuit to isolate the video signals coming from the CCD sensor in the camera head.
Figure 4:
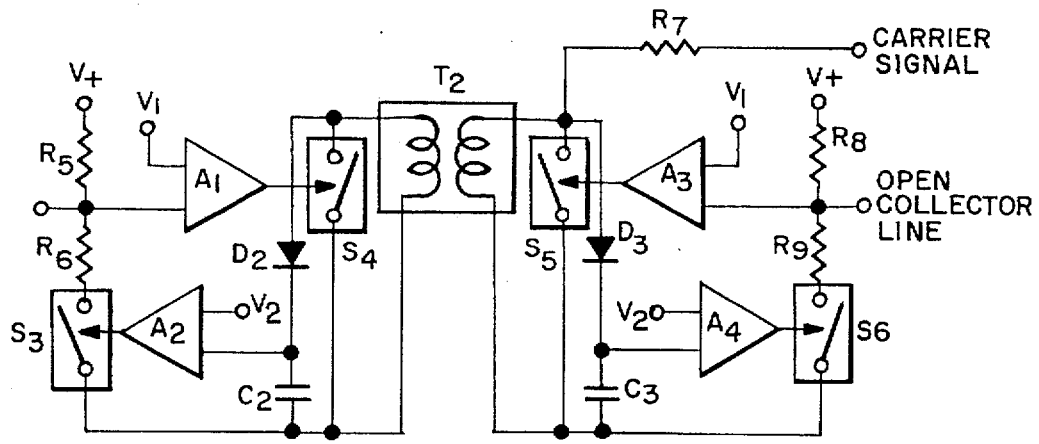
FIG. 4 is a simplified schematic of an isolation circuitry for isolating bidirectional signals on an open collector data line.
Figure 5:
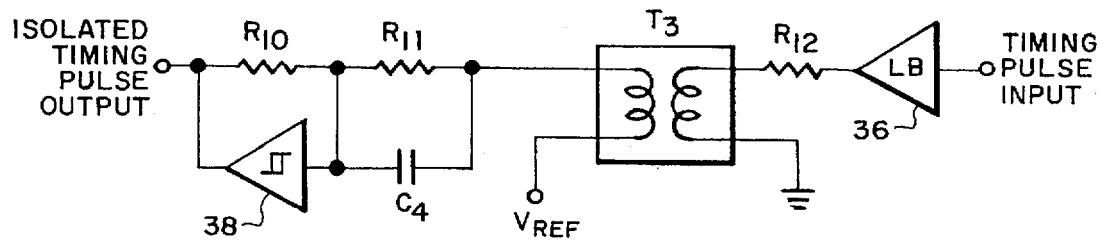
FIG. 5 is a simplified schematic diagram of a typical isolation circuit for each timing pulse signal going to the video camera head.

The methods of isolation of the three types of signals (i.e., video signal, bidirectional open collector data signals and timing pulses) are illustrated in the simplified schematic diagrams of FIGS. 3, 4 and 5 respectively. FIG. 3 illustrates a video signal isolation channel receiving a video signal from a CCD sensor in camera head 10 which is amplified by a wide band amplifier having a gain of 4 (not shown) and driven down umbilical cord 15 through connectors to terminals 22 and 24. The video signal terminates at series/parallel combination of resistors $R_1$, $R_2$, Switch $S_1$ and pulse transformer $T_1$, as shown in FIG. 3.

Pulse transformer $T_1$ is a high pass channel, and is provided with a low impedance termination by resistors $R_1$ and $R_2$. Switch $S_1$ represents MOS/FET transistor $Q_1$, and is normally closed so that the primary of pulse transformer $T_1$ is connected to ground through terminal 24 and the video signal passes normally. However, when a shutter pulse is present on terminal 25, solid state switch $S_1$ is turned off by a logic level signal applied through zener diode $D_1$ and resistor $R_4$. This opens the primary circuit of pulse transformer $T_1$ and prevents any current from the shutter pulse on terminal 25 from flowing. This blocks the shutter pulse from affecting the transformer circuit and keeps the pulse out of the video path.

The output signal of pulse transformer $T_1$, across resistor $R_3$, is then applied to a processing circuit represented by switch $S_2$ via blocking capacitance $C_1$. Switch $S_2$, representing processing circuit 26, provides a pixel rate clamping pulse.

The special techniques used for processing bidirectional open collector data signals is shown in the simplified schematic diagram of FIG. 4. The open collector data signal isolation circuit uses pulse transformer $T_2$ because it has the useful ability to transfer impedance from one winding to another regardless of direction (primary to secondary or vice versa) so it can be used for isolation by representing a logical state as an impedance. The impedance is controlled by an electronic shunt switch connected to both windings of transformer $T_2$ and applying an AC voltage source (a carrier signal) to one of the windings through resistor $R_7$. When primary switch $S_5$ or secondary switch $S_4$ is closed, the level of the carrier signal drops on both sides of transformer $T_2$ analogous to the level drop on an open collector line. This signal is translated into an open collector logic signal by a pair of detectors represented by amplifier $A_3$ and amplifier $A_4$, diode $D_3$ and capacitor $C_3$ respectively.

To translate the carrier signal into an open collector logic signal, the carrier is first detected by transistor/capacitor circuit represented by amplifier $A_4$, capacitor $C_3$ and diode $D_3$ on one side of pulse transformer $T_2$, and by transistor capacitor circuit comprised of amplifier. $A_2$, capacitor $C_2$ and diode $D_2$ on the secondary side of transformer $T_2$. The signal is translated into a logic level by open collector solid state switch $S_6$ in combination with series resistors $R_8$ and $R_9$ for pull-up and solid state switch $S_3$, with series resistors $R_5$ and $R_6$ for pull-up. When the level of the carrier signal is above the level of a reference voltage $V_2$ applied to transistor amplifier $A_4$, the logic output is high and vice versa.

A way is also provided to detect a low carrier level, as the result of a low logic level on the same side or on the secondary side of transformer $T_4$ so the system will not lock itself in a low state (latch-up) while sending a low level. A low carrier level is detected by placing a small offset in the pull-down level of solid state switches $S_3$ and $S_6$. When solid state switch $S_6$ is closed, resistor $R_9$ keeps a low voltage level above the level of reference voltage $V_1$ applied to transistor amplifier $A_3$, which then ignores it. When an external standard open collector device signal pulls the line low, however, it will pull below the level of reference voltage $V_1$ and cause transistor amplifier $A_3$ to close solid state switch $S_5$ and transmit a low level signal across pulse transformer $T_2$. Solid state switch $S_3$, resistor $R_6$ and transistor amplifier $A_1$ on the opposite side of pulse transformer $T_2$ work in the same manner.

Each timing pulse signal is isolated by the methods shown in the simplified schematic diagram of FIG. 5. The timing pulses are simple logic level pulses. To isolate these pulses, a circuit such as that shown in simplified schematic diagram of FIG. 5, is used to pass pulses much longer than the time constant of the primary of pulse transformer $T_3$ driven with pulses from logic buffer 36 via resistor $R_{12}$. Since the timing pulse is much longer than the inductance/resistance (L/R) time constant of pulse transformer $T_3$, only the L/R spikes representing the leading and lagging edges of the timing pulse are passed through transformer $T_3$. The leading and lagging spikes, representing the edges of each timing pulse, are biased through voltage $V_{ref}$ at the secondary of transformer $T_3$, and applied to hysteresis buffer 38 which toggles up and down to reconstruct or recover the timing pulse outputs. Each timing pulse of the processing circuitry will be isolated with the same circuitry as shown in the simplified schematic diagram of FIG. 5.

Thus, there has been described separate circuitry which can be incorporated into the video processing motherboard, that isolates the endoscopic video camera head from camera electronics so that the host chassis and circuitry remains at ground level. Only the endoscopic video camera head is isolated. The three distinct types of signals (i.e., video signal, bidirectional open collector data signals, and timing pulses) are isolated at the umbilical cord going from the video processing circuitry to the video camera head. This provides distinct advantages since it is more direct, and doesn't impact the input/output structure of the video camera. The signals needed to support the endoscopic video camera head are isolated with simple pulse transformer circuits. The video signals are isolated with special circuitry that prevents interference from shutter pulses and can process the wide bandwidth of the video output signal. The bidirectional open collector data signals are isolated with special switching circuits to allow the processing that can sense direction and maintain speed. The timing pulses are also isolated with pulse transformers by converting them to leading and lagging spikes on one side, and then reconstructing them on the secondary side of the transformer.

This invention is not to be limited by the embodiment shown in the drawings and described in the description which is given by way of example and not of limitation, but only in accordance with the scope of the appended claims.

What is claimed is:

1. An electrical isolation circuit for endoscopic video cameras comprising;

a video camera head having a CCD sensor;

an electronic video processing circuit including a plurality of signal lines interposed between said video camera head and said electronic video processing circuit, wherein at least some of said signal lines transmit a shutter pulse and a video signal;

electrical isolation circuit means interposed between said electronic video processing circuit and said video camera head for isolating said electronic video processing circuit; wherein said electrical isolation circuit means comprises a separate pulse transformer in each signal line; and interference preventing means to prevent interference from shutter pulse signals comprising switch means for interrupting said video signal when said shutter pulse is received.

2. An electrical isolation circuit for endoscopic video cameras comprising;

a video camera having a CCD sensor;

an electronic video processing circuit including a plurality of signal lines, at least some of which transmit bidirectional signals between said electronic video processing circuit and said video camera; and electrical isolation circuit means interposed between said electronic video processing circuit and said video camera for isolating said electronic video processing circuit;

said electrical isolation circuit means including open collector bidirectional signal isolation means for sensing direction and maintaining the speed of said bidirectional signals.

3. The electrical isolation circuit according to claim 2 wherein; said electrical isolation circuit means comprises a plurality of pulse transformers.

4. The electrical isolation circuit according to claim 3 in which said plurality of pulse transformers comprise a separate pulse transformer in each signal line of said electronic video processing circuit.

5. The electrical isolation circuit according to claim 4 wherein said plurality of signal lines include a video signal line and a shutter pulse line, the electrical isolation circuit further including interference preventing means for preventing interference from shutter pulse signals on said video signal line.

6. The electrical isolation circuit according to claim 5 in which said interference preventing means comprises switch means for interrupting a video signal on said video signal line when a shutter pulse is received.

7. The electrical isolation circuit according to claim 4 in which said switch means is a transistor switch; said transistor switch being normally on; and a switch circuit for turning said transistor switch off when a shutter pulse is received.

8. The electrical isolation circuit according to claim 7 in which said transistor switch means comprises a MOS FET transistor switch.

9. The electrical isolation circuit according to claim 8 wherein at least some of said plurality of signal lines transmit a plurality of timing pulses; said electrical isolation circuit means including an isolating pulse transformer for each signal line transmitting a timing pulse; timing pulse converting means for converting each timing pulse to a leading and lagging spike; and timing pulse reconstructing means for reconstructing said timing pulses on a secondary side of each of said isolating pulse transformers.

10. The electrical isolation circuit according to claim 9 in which said timing pulse converting means comprises; a resistor in series with a primary winding of said isolating pulse transformer; and a logic buffer driving said plurality of timing pulses whereby pulses much longer than the time constant of said resistor and transformer are passed.

11. The electrical isolation circuit according to claim 6 in which said timing pulse reconstructing means comprises; biasing means biasing said leading and lagging spikes to a reference voltage; and a hysteresis buffer which changes state to reconstruct said timing pulses.

12. The electrical isolation circuit according to claim 8 in which said open collector bidirectional signal isolation means comprises; a pulse transformer; translating means for translating a carrier signal into an open collector signal for transmission across said pulse transformer.

13. The electrical isolation circuit according to claim 12 in which said translating means comprises; an electronic shunt switch connected to primary and secondary windings of said pulse transformer; a resistor connected to said primary winding of said pulse transformer; and means applying an AC voltage carrier signal to said pulse transformer through said resistor.

14. The electrical isolation circuit according to claim 13 in which said electronic shunt switch comprises; first detecting means for detecting and translating said carrier. signal to a logic level and; second detector means detecting a low carrier level as a result of a low logic signal level; whereby said bidirectional signals are transferred from said primary winding of said pulse transformer.

15. The electrical isolation circuit according to claim 14 in which said first detecting means comprises; a transistor in series with a capacitor for detecting said carrier signal; and an open collector switch to translate said detected carrier signal to said logic level.

16. The electrical isolation circuit according to claim 15 wherein at least some of said plurality of signal lines transmit a plurality of timing pulses; said electrical circuit isolation circuit means including an isolating pulse transformer for each signal line transmitting a timing pulse; timing pulse converting mean for converting each timing pulse to a leading and lagging spike; and timing pulse reconstructing means for reconstructing said timing pulses on a secondary side of each of said isolating pulse transformers.

17. The electrical isolation circuit according to claim 16 in which said timing pulse converting means comprises; a resistor in series with a primary winding of said isolating pulse transformer; and a logic buffer driving said plurality of timing pulses whereby pulses much longer than the time constant of said resistor and transformer are passed.

18. The electrical isolation circuit according to claim 17 in which said timing pulse reconstructing means comprises; biasing means biasing said leading and lagging spikes to a reference voltage; and a hysteresis buffer which changes state to reconstruct said timing pulses.

19. The electrical isolation circuit according to claim 2 in which said open collector bidirectional signal isolation means comprises; a pulse transformer and; translating means for a translating a carrier signal into an open collector signal for transmission across said pulse transformer.

20. The electrical isolation circuit according to claim 19 in which said translating means comprises; an electronic shunt switch connected to primary and secondary windings of said pulse transformer; a resistor connected to said primary winding of said pulse transformer; and means applying an AC voltage carrier signal to said pulse transformer through said resistor.

21. The electrical isolation circuit according to claim 20 in which said electronic shunt switch comprises; first detecting means for detecting and translating said carrier signal to a logic level and; second detector means detecting a low carrier level as a result of a low logic signal level; whereby said bidirectional data signal is transferred from said primary winding of said pulse transformer.

22. The electrical isolation circuit according to claim 21 in which said first detecting means comprises a transistor in series with a capacitor for detecting said carrier signal; and an open collector switch to translate said detected carrier signal to said logic level.

23. The electrical isolation circuit according to claim 2 wherein at least some of said plurality of signal lines transmit a plurality of timing pulses; said electronic isolation circuit means including an isolating pulse transformer for each signal line transmitting a timing pulse; timing pulse converting each timing pulse to a leading and lagging spike; and timing pulse reconstructing means for reconstructing said timing pulses on a secondary side of each of said isolating pulse transformers.

24. The electrical isolation circuit according to claim 23 in which said timing pulse converting means comprises; a resistor in series with a primary winding of said isolating pulse transformer and a logic buffer driving said plurality of timing pulses whereby pulses much longer than the time constant of said resistor and transformer are passed.

25. The electrical isolation circuit according to claim 24 in which said timing pulse reconstructing means comprises; biasing means biasing said leading and lagging spikes to a reference voltage; and a hysteresis buffer which changes state to reconstruct said timing pulses.

* * * * *

UNITED STATES PATENT AND TRADEMARK OFFICE
CERTIFICATE OF CORRECTION

Page 1 of 2

PATENT NO. : 5,716,323
DATED : February 10, 1998
INVENTOR(S) : David B. Lee

It is certified that error appears in the above-identified patent and that said Letters Patent is hereby corrected as shown below:

Claim 7, line 1 (Column 8, line 11) change " 4 " to -- 6 --;

Claim 8, line 2 (Column 8, line 16) delete " means ";

Claim 11, line 1 (Column 8, line 33) change " 6 " to -- 10 --;

Claim 14, line 3 (Column 8, line 52) after " carrier " delete " . ";

line 4 (Column 8, line 53) change " level and; " to -- level; and --;

Signed and Sealed this

Eighth Day of September, 1998

*Attest:*

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5716323
DATED : February 10, 1998
INVENTOR(S) : David B. Lee

It is certified that error appears in the above-identified patent and that said Letters Patent is hereby corrected as shown below:

Claim 16, line 3 (Column 8, line 64) delete " circuit ";

Claim 19, line 3 (Column 9, line 18) change " transformer and; " to -- transformer; and --;

line 4 (Column 9, line 19) delete " a " (first occurrence);

Claim 21, line 6 (Column 10, line 2), change " data signal is " to -- signals are --;

Claim 23, line 6 (Column 10, line 14) after " converting " insert -- means converting --.

Signed and Sealed this

Eighth Day of September, 1998

Attest:

BRUCE LEHMAN

*Attesting Officer*    *Commissioner of Patents and Trademarks*